US010933486B2

(12) United States Patent
Casner (10) Patent No.: US 10,933,486 B2
(45) Date of Patent: Mar. 2, 2021

(54) REMOTE MASTER RESET OF MACHINE

(71) Applicant: Illinois Tool Works Inc., Glenview, IL (US)

(72) Inventor: Bruce A. Casner, Neenah, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 104 days.

(21) Appl. No.: 13/780,512

(22) Filed: Feb. 28, 2013

(65) Prior Publication Data
US 2014/0238964 A1 Aug. 28, 2014

(51) Int. Cl.
*B23K 9/10* (2006.01)

(52) U.S. Cl.
CPC .................. *B23K 9/1087* (2013.01)

(58) Field of Classification Search
CPC ...... B23K 9/1087; B23K 9/10; B23K 9/0953; B23K 9/124; B23K 9/32; B23K 9/095; B23K 9/127; H04B 3/546; H04B 2203/5458; H04B 2203/547; H04B 2203/5483; H04B 2203/5491; H04L 1/1867; H04L 27/18
USPC ...... 219/121.28, 121.29, 121.3, 121.32, 132, 219/125.12, 124.22, 124.34; 340/426.13, 340/426.14, 426.15, 426.16, 426.17, 340/426.18–426.36; 901/41, 42, 43, 44, 901/45, 46, 47
See application file for complete search history.

(56) References Cited

U.S. PATENT DOCUMENTS

| 4,024,371 | A | * | 5/1977 | Drake | B23K 11/252 219/110 |
|---|---|---|---|---|---|
| 4,216,367 | A | * | 8/1980 | Risberg | B23K 9/1087 219/132 |
| 4,456,809 | A | * | 6/1984 | Jones | B23K 11/252 219/108 |
| 4,485,959 | A | * | 12/1984 | Orlando | B23P 21/00 219/80 |
| 4,497,019 | A | * | 1/1985 | Waber | B23P 21/00 700/3 |
| 4,544,825 | A | * | 10/1985 | Cook | B23K 9/127 219/124.22 |
| 4,561,059 | A | * | 12/1985 | Davis et al. | 700/212 |
| 4,608,651 | A | * | 8/1986 | Murakami et al. | 700/250 |
| 4,658,112 | A | * | 4/1987 | Thompson | B23K 9/127 219/124.22 |
| 4,821,202 | A | * | 4/1989 | Davis | B23K 9/067 219/124.02 |

(Continued)

FOREIGN PATENT DOCUMENTS

JP    2002-312072    * 10/2002

OTHER PUBLICATIONS

International Search Report from PCT application No. PCT/US2014/016735, dated Jul. 14, 2014, 9 pgs.

*Primary Examiner* — Ibrahime A Abraham
*Assistant Examiner* — Gyounghyun Bae
(74) *Attorney, Agent, or Firm* — McAndrews, Held & Malloy, Ltd.

(57) ABSTRACT

A welding machine includes one or more processors configured to control the welding machine and remote reset circuitry communicatively coupled to the one or more processors. The remote reset circuitry is configured to receive a remote signal and to reset the one or more processors based at least in part on the remote signal.

19 Claims, 3 Drawing Sheets

(56) References Cited

U.S. PATENT DOCUMENTS

| | | | | |
|---|---|---|---|---|
| 4,877,940 A * | 10/1989 | Bangs | B23Q 35/127 | 219/124.34 |
| 4,962,338 A * | 10/1990 | Daggett et al. | 318/568.11 | |
| 5,063,282 A * | 11/1991 | Gilliland | B23K 9/1056 | 219/130.51 |
| 5,742,022 A * | 4/1998 | Crawford et al. | 219/86.25 | |
| 6,040,555 A * | 3/2000 | Tiller | B23K 9/1087 | 219/132 |
| 6,051,810 A * | 4/2000 | Stava | B23K 9/092 | 219/130.33 |
| 6,066,824 A * | 5/2000 | Crawford et al. | 219/86.31 | |
| 6,072,146 A * | 6/2000 | Matuschek et al. | 219/110 | |
| 6,107,601 A * | 8/2000 | Shimogama | B23K 9/1037 | 219/130.01 |
| 6,145,041 A | 11/2000 | Chambers | | |
| 6,445,979 B1 * | 9/2002 | Inoue et al. | 700/258 | |
| 6,624,388 B1 * | 9/2003 | Blankenship | B23K 9/1062 | 219/130.5 |
| 6,636,776 B1 * | 10/2003 | Barton | B23K 9/1062 | 219/109 |
| 6,710,299 B2 | 3/2004 | Blankenship | B23K 9/0953 | 219/130.5 |
| 6,797,921 B1 * | 9/2004 | Niedereder | B23K 9/1062 | 219/130.5 |
| 7,220,941 B2 * | 5/2007 | Niedereder | B23K 9/0953 | 219/130.5 |
| 7,375,304 B2 | 5/2008 | Kainec | | |
| 7,979,162 B2 * | 7/2011 | Niemela et al. | 700/264 | |
| 7,996,276 B2 * | 8/2011 | Blankenship | B23K 9/1062 | 219/121.11 |
| 2002/0005393 A1 * | 1/2002 | Rohrberg | B23K 9/028 | 219/60 A |
| 2002/0152425 A1 | 10/2002 | Chaiken | | |
| 2003/0071024 A1 * | 4/2003 | Hsu | B23K 9/0953 | 219/130.01 |
| 2004/0140302 A1 * | 7/2004 | Myers | B23K 9/0253 | 219/130.51 |
| 2004/0217091 A1 * | 11/2004 | Schmidt | B23K 9/1056 | 219/98 |
| 2005/0224466 A1 * | 10/2005 | Halvorsen | G05D 7/0635 | 219/74 |
| 2005/0242076 A1 * | 11/2005 | Stava | B23K 9/1068 | 219/130.5 |
| 2005/0258154 A1 * | 11/2005 | Blankenship | B23K 9/0953 | 219/130.01 |
| 2006/0027547 A1 * | 2/2006 | Silvestro | B23K 9/323 | 219/133 |
| 2006/0163228 A1 * | 7/2006 | Daniel | B23K 9/0956 | 219/130.01 |
| 2006/0243718 A1 * | 11/2006 | Enyedy | B23K 9/133 | 219/137.71 |
| 2007/0039934 A1 * | 2/2007 | Enyedy | B23K 9/1336 | 219/137.71 |
| 2007/0056942 A1 * | 3/2007 | Daniel | B23K 9/1062 | 219/125.1 |
| 2007/0080154 A1 | 4/2007 | Ott | | |
| 2008/0011727 A1 * | 1/2008 | Peters | B23K 9/025 | 219/130.5 |
| 2008/0116186 A1 * | 5/2008 | Luck | B23K 9/1087 | 219/132 |
| 2008/0235970 A1 * | 10/2008 | Crampton | 33/503 | |
| 2008/0237201 A1 * | 10/2008 | Shipulski | B23K 10/02 | 219/121.48 |
| 2008/0308539 A1 * | 12/2008 | Flagg | B23K 37/0282 | 219/124.1 |
| 2009/0200276 A1 * | 8/2009 | Mitterhumer | B23K 1/006 | 219/121.44 |
| 2010/0108654 A1 * | 5/2010 | Ulrich | B23K 9/0953 | 219/130.5 |
| 2010/0241260 A1 * | 9/2010 | Kilibarda | B25J 9/1602 | 700/95 |
| 2010/0308027 A1 * | 12/2010 | Vogel | B23K 9/0953 | 219/130.21 |
| 2011/0204034 A1 * | 8/2011 | Schartner | B23K 9/09 | 219/137 PS |
| 2011/0220628 A1 * | 9/2011 | Mehn | B23K 9/124 | 219/130.1 |
| 2012/0012561 A1 * | 1/2012 | Wiryadinata | 219/108 | |
| 2012/0205359 A1 * | 8/2012 | Daniel | 219/130.01 | |
| 2012/0248078 A1 * | 10/2012 | Zediker | E21B 7/14 | 219/121.67 |
| 2012/0248082 A1 * | 10/2012 | O'Connell | B23K 9/02 | 219/137 R |
| 2012/0298644 A1 * | 11/2012 | Lambert | B23K 9/0953 | 219/130.31 |
| 2012/0305532 A1 * | 12/2012 | Harris | B23K 9/044 | 219/76.14 |
| 2012/0325792 A1 * | 12/2012 | Stein et al. | 219/148 | |
| 2013/0015163 A1 * | 1/2013 | Jones | B23K 9/1006 | 219/74 |
| 2013/0015169 A1 * | 1/2013 | Marschke | B23K 9/1062 | 219/130.1 |
| 2013/0075380 A1 * | 3/2013 | Albrech | B23K 9/1006 | 219/137 R |
| 2013/0119036 A1 * | 5/2013 | Daniel | B23K 9/095 | 219/130.21 |
| 2014/0001169 A1 * | 1/2014 | Enyedy | B23K 9/173 | 219/137.71 |

\* cited by examiner

REMOTE MASTER RESET OF MACHINE

BACKGROUND

The invention relates generally to welding system networks and, more particularly, to a welding system network with a network controller located remotely from a welding machine.

Welding systems support a variety of processes, such as metal inert gas (MIG) welding, tungsten inert gas (TIG) welding, stick welding, and so forth, which may operate in different modes, such as constant current or constant voltage, among others. Welding systems may connect to and support multiple processes at the same time utilizing processors. In some welding applications, such as robotic assembly, the welding power source may be located in a rack or mezzanine in a remote location. A processor may be restarted to change certain operations of the welding system. Unfortunately, turning off the welding system to restart the processor may be difficult and/or time consuming due to the remote location. Furthermore, repeatedly turning the welding system off and on may stress components (e.g., capacitors, inductors, and so forth) of the multi-process welding system.

BRIEF DESCRIPTION

In one embodiment, a welding machine includes one or more processors configured to control the welding machine and remote reset circuitry communicatively coupled to the one or more processors. The remote reset circuitry is configured to receive a remote signal and to reset the one or more processors based at least in part on the remote signal.

In another embodiment, a welding system includes a network controller configured to communicatively couple to a first welding machine. The first welding machine includes a first plurality of processors. The network controller is configured to reset the first plurality of processors based at least in part on the remote reset signal.

In another embodiment, a method includes receiving a reset input at a first welding machine. The reset input is received from a remote location relative to the first welding machine. The method also includes resetting one or more processors of the first welding machine based at least in part on the reset input.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Welding machines convert input power to welding power for welding applications. Operating components of the welding machine control various operational aspects of the welding machine and/or provide additional features to the welding machine. The operating components include processors to execute instructions that control the various aspects and features of the welding machine. The processors may be turned off to load a new set of instructions. Turning off power conversion circuitry of the welding machine may induce stresses on circuit elements (e.g., capacitors, inductors, and so forth). Rather than turning off the welding machine to load a new set of instructions or to refresh a set of instructions, embodiments described herein reset one or more processors in response to a reset signal from a controller without turning off the power conversion circuitry.

Certain embodiments transmit the reset signal to welding machines from network controllers in remote locations. The network controller may be disposed in a convenient and accessible location, whereas the one or more welding machines may be arranged in racks or mezzanines. The network controller described herein conveniently enables an operator to update the processors of multiple welding machines from a location remote from the individual welding machines. In some embodiments, an operator may use the network controller to remotely update multiple welding machines simultaneously (e.g., within approximately 10 seconds, 5 seconds, 1 second, or less). The network controller may selectively reset processors of welding machines, thereby reducing the disruption of the operation of the welding machine.

Figure 1:
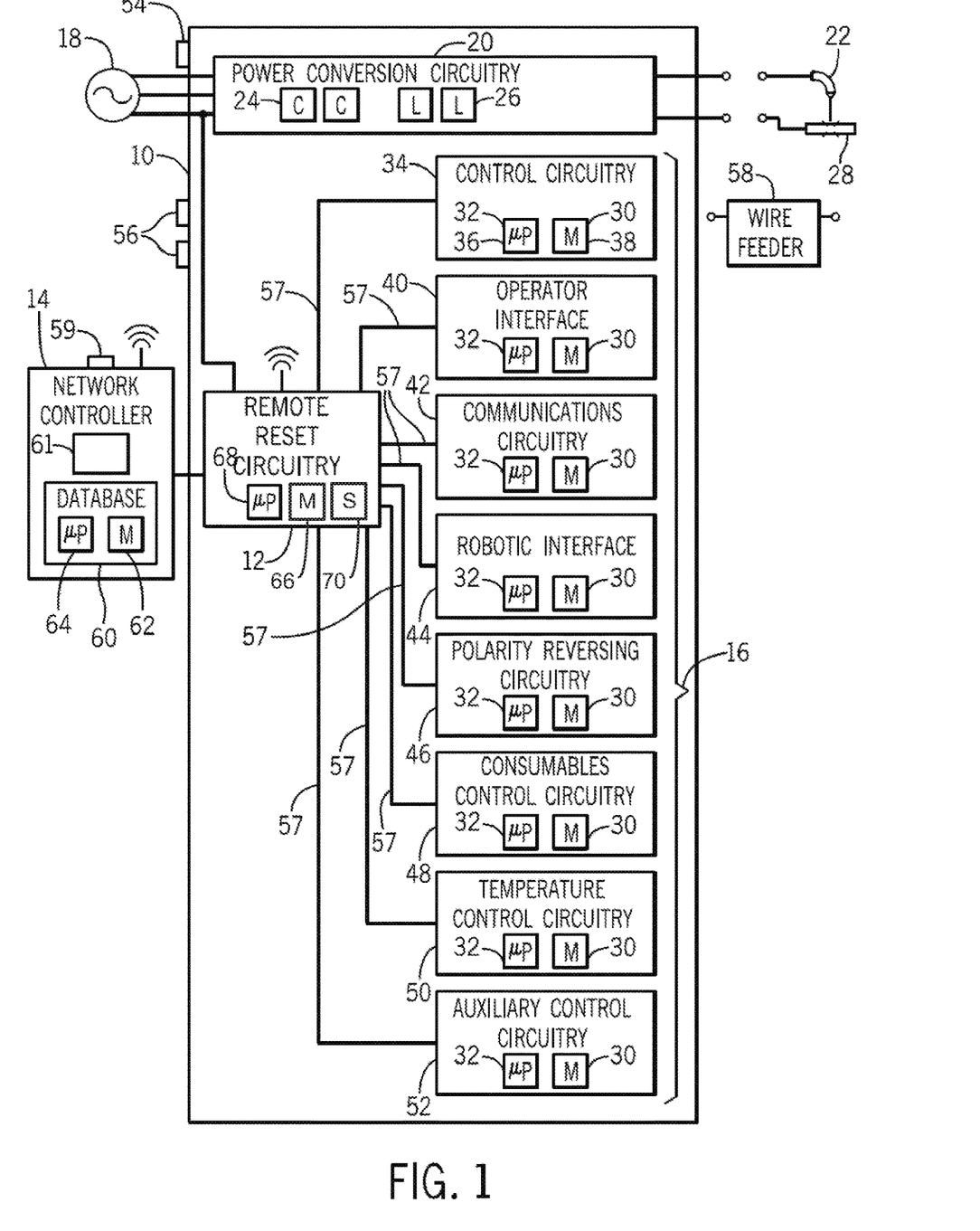
FIG. 1 is a schematic diagram of an embodiment of a welding machine employing remote reset circuitry coupled to a network controller.

FIG. 1 is a schematic diagram of an embodiment of a welding machine 10 employing a remote reset circuitry 12 coupled to a network controller 14 and to operating components 16 of the welding machine 10. The welding machine 10 receives input power from a power source 18. Power conversion circuitry 20 of the welding machine 10 converts the input power to either direct current (DC) or alternating current (AC) of a desired form to supply to a torch 22. The power conversion circuitry 20 may include circuit elements such as capacitors 24, inductors 26 (e.g., coils), transformers, switches, boost converters, inverters, and so forth, capable of converting power as dictated by the demands of the welding machine 10. The welding machine 10 is electrically connected to a workpiece 28 to form an arc with the torch 22 for welding applications. The torch 22 may be operated manually by an operator or automatically by a robotic welding system.

The operating components 16 include circuits and interfaces that may provide various functions for the welding machine 10. In some embodiments, each component of the operating components 16 has a memory 30 for storing machine-readable instructions that may be executed by a respective processor 32 of the operating component 16. The memory 30 may include, for example, random-access memory, read-only memory, rewritable flash memory, hard drives, and optical discs. The operating components 16 may include, but are not limited to, one or more of the circuitry and interface components illustrated in FIG. 1. Additionally, while the circuitry and interface components are shown separately, various components may be combined such that the memories 30 and/or the processors 32 are shared by two or more components. For example, a control circuitry component 34 may share a control processor 36 and a control memory 38 with an operator interface 40.

The control circuitry 34 controls the welding output provided to the torch 22 and the workpiece 28 by controlling the power conversion circuitry 20. In some embodiments, the control circuitry 34 controls other operating components 16, such as communications circuitry 42, a robotic interface 44, polarity reversing circuitry 46, consumables control circuitry 48, temperature control circuitry 50, or auxiliary control circuitry 52, or any combination thereof. The operator interface 40 receives operator inputs directly into the welding machine 10, such as via a power switch 54 or operator controls 56. Operator controls 56 (e.g., buttons, knobs, switches) may enable the operator to directly adjust parameters (e.g., voltage, current, waveform shape, pulse duration, etc.) of the welding power supplied to the torch 22.

The communications circuitry 42 enables the welding machine 10 to communicate signals with the torch 22, a wire feeder 58, pendant, or other welding machine peripheral. A robotic interface 44 connects to a robotic welding system to enable the welding machine 10 to perform welding applications automatically through a robot. In some embodiments, the robotic welding system enables the welding machine 10 to provide rapid and consistent quality welds. The polarity reversing circuitry 46 enables the welding machine 10 to switch the polarity of the terminals of the welding machine 10. For example, an operator may inadvertently connect the torch 22 to a negative terminal when intending to perform a welding application with DC electrode positive (DCEP) output. The polarity reversing circuitry 46 may detect the improper connection and reverse the polarity of the terminals or alert the operator.

The consumables control circuitry 48 enables the welding machine 10 to control the rate at which consumables (e.g., wire, shielding gas, and so forth) are consumed during the welding application. The consumables control circuitry 48 may control the wire feeder 58 to control the rate at which the welding wire leaves the torch 22. The consumables control circuitry 48 may adjust gas valves to control the quantity and/or type of shielding gas supplied to the torch 22. The temperature control circuitry 50 enables the welding machine 10 to control cooling equipment and/or heating equipment to control the temperature of the welding machine 10, the torch 22, and/or the workpiece 22. For example, a water cooler controlled by the temperature control circuitry 50 cools the torch power conversion circuitry 20 and/or the torch 22 to increase the duty cycle of the welding machine 10. The temperature control circuitry 50 may control an inductive heater utilized to warm the workpiece 28 prior to and/or during a welding application.

The auxiliary control circuitry 52 enables the welding machine 10 to control auxiliary components connected to the welding machine 10. For example, the auxiliary control circuitry 52 may control an engine, power tool, or other auxiliary component. Presently contemplated embodiments are not limited to the operating components 16 shown in FIG. 1 and discussed above. Rather, some embodiments of the welding machine 10 may include any of the above described operating components 16 or with others not described herein.

Each processor 32 of the welding machine 10 executes machine-readable instructions to enable the respective operating component 16 to provide a desired functionality to the welding machine 10. For example, the control processor 36 may execute instructions to change the current and/or voltage of the welding power supplied to the torch 22. However, sometimes a processor 32 may be turned off, or reset, to change the operating instructions or registry settings for the processor 32. For example, instructions corresponding to an update of an operating system, a change to the appearance of a graphical user interface (GUI) of the operator interface 40, or a change in communication protocols between the robotic interface 44 and the robotic welding system, may be implemented when the processor 32 is turned off. Moreover, a processor 32 may be reset to calibrate the welding machine 10 or to reset the processor 32 to a known state.

The power switch 54 turns the welding machine 10 on or off. When the power switch 54 is turned on, the power conversion circuitry 20, the remote reset circuitry 12, and the operating components 16 are powered by the power source 18. The capacitors 24 and the inductors 26 are charged when the power conversion circuitry 20 is powered. When the power switch 54 is turned off, the power conversion circuitry 20, the remote reset circuitry 12, and the operating components 16 do not receive power from the power source 18. The capacitors 24 and the inductors 26 are discharged when the power conversion circuitry 20 is unpowered. Power cycles, particularly rapid power cycles such as resets, may induce stresses on the capacitors 24 and inductors 26 of the power conversion circuitry 20. These stresses may decrease the lifespan of the circuit elements of the power conversion circuitry 20. Accordingly, it may be desirable to turn off one or more of the processors 32 to reset the processors 32 without turning off the power conversion circuitry 20 because resetting the power conversion circuitry 20 may induce stresses on the capacitors 24 and the inductors 26.

The remote reset circuitry 12 connects to each of the operating components 16 and controls when the processors 32 are reset. In some embodiments, the remote reset circuitry 12 separately controls each of the processors 32 via separate control lines 57. Separate control of the processors 32 enables the remote reset circuitry 12 to selectively reset certain processors 32 at different times, or approximately simultaneously (e.g., within approximately 1 second or less). In some embodiments, the remote reset circuitry 12 connects to the processors 32 through a shared reset line. The remote reset circuitry 12 may address each processor 32 according to a corresponding operating component identifier in a control signal (e.g., reset signal). The remote reset circuitry 12 may collectively control the processors 32 with the shared reset line. In some embodiments, the remote reset circuitry 12 is a network interface. The network controller 14, which may be located remote from the welding machine 10, supplies a reset signal to the remote reset circuitry 12 (e.g., network interface) via a wired or wireless connection. As discussed herein, a remote location relative to a welding machine is a location in another room or building than the welding machine, a location that is relatively inaccessible from the welding machine 10, or a location that is separated a distance (e.g., approximately 6, 10, 25, 50, or 100 ft) from the welding machine 10. For example, a remote location may include, but is not limited to, a control room, a control building, or a control station at a first level (e.g., ground level) when the welding machine 10 is on an elevated rack or mezzanine at a second level (e.g., 8 ft above ground level). A reset input to the network controller 14, such as pressing a reset switch 59 of the network controller 14 or selecting a reset option on a display 61 of the network controller 14, transmits the reset signal from the network controller 14 to the network interface 12.

In some embodiments, the network controller 14 may be coupled to the network interface 12 via a serial connection, including, but not limited to RS-232, RS-485, or Universal Serial Bus (USB). In some embodiments, the network controller 14 may be coupled by a wired or wireless connection to a shared reset line of the processors 32. In some embodiments, the network controller 14 may be coupled to the network interface 12 via an Ethernet network, such as the internet, EtherNetIP, or PROFINET. In response to the reset signal, the remote reset circuitry 12 (e.g., network interface) may reset one or more processors 32.

The remote reset circuitry 12 enables one or more of the processors 32 to be reset without turning off the power conversion circuitry 20. Additionally, the remote reset circuitry 12 (e.g., network interface) and the network controller 14 enable an operator to reset the one or more processors 32 remotely without going to the welding machine 10 and manually resetting the one or more processors 32. Accordingly, the remote reset provided by the network interface 12 and the network controller 14 may reduce the amount of time to update an operating component 16 and/or to load a new set of instructions for a welding machine 10 installed in a remote location (e.g., elevated rack, mezzanine, and so forth).

Figure 2:
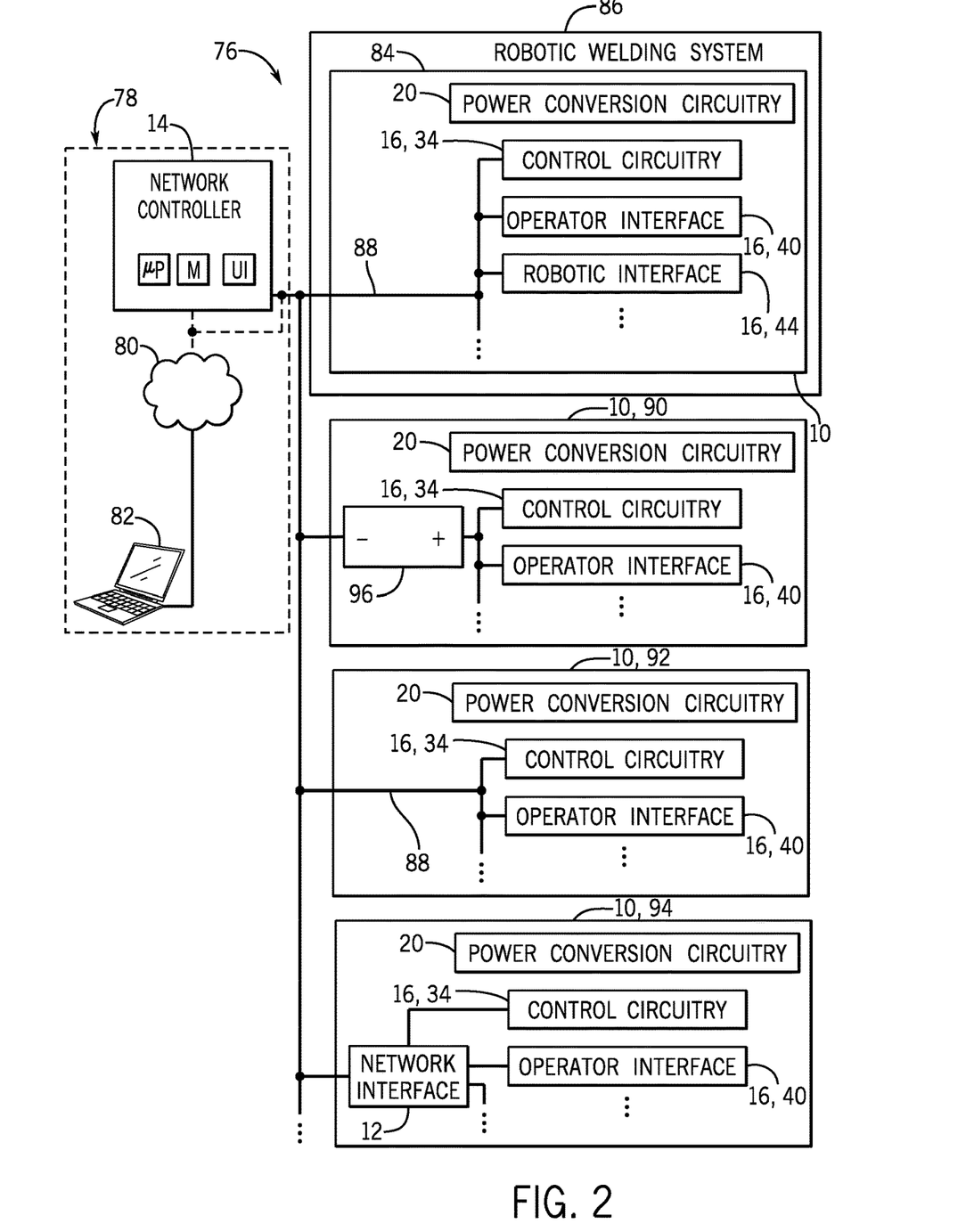
FIG. 2 is a schematic diagram of an embodiment of a welding system employing a network controller coupled to multiple welding machines.

In some embodiments, the remote reset circuitry 12 supplies a new set of machine-readable instructions to the memory 30 and the reset processor 32. The new set of instructions may be selected from a database 60 by an operator. The database 60 may be a part of the network controller 14, as illustrated in FIG. 2. In some embodiments, the database 60 or information in the database 60 may be communicated with the network controller 14 via a wired or wireless connection. A database memory 62 stores sets of instructions for the processors 32 of the operating components 16. A database processor 64 enables the network controller 14 to select and transmit a desired set of instructions to the remote reset circuitry 12 and to the respective operating component 16. The database 60 is communicatively coupled to the network controller 14, enabling the network controller 14 to select instructions from the database memory 62 for use with any welding machine 10 connected to the network controller 14. For example, the network controller 14 of a remote network may control 2, 3, 4, 5, 6, 7, 8, 9, 10, or more welding machines 10 of a welding system. In some embodiments, the network controller 14 of the remote network may load the same set of instructions (e.g., operating system update) to each of the welding machines 10. In some embodiments, the network controller 14 may load separate sets of instructions for each welding machine 10 of a welding system.

In some embodiments, a network interface memory 66 stores instructions for the processors 32 of the operating components 16. The network interface memory 66 may be an intermediate storage medium to store instructions from the network controller 14 for various operating components 16. In some embodiments, the network interface memory 66 stores sets of instructions for the processors 32 like the database memory 62. A network interface processor 68 may select the instructions from the network interface memory 66 based at least in part on the reset signal from the network controller 14. In some embodiments, the reset signal resets the network interface processor 68 and the one or more processors 32 of the operating components 16. For example, the network interface processor 68 may reset the one or more processors 32 of the operating components 16 upon receipt of the reset signal, then reset itself to load a new set of instructions for the remote reset circuitry 12.

FIG. 2 is a schematic diagram of an embodiment of a welding system 76 employing a network controller 14 coupled to multiple welding machines 10. The welding machines 10 couple to a remote network 78 via a wired or wireless connection. The remote network 78 may include the network controller 14, a cloud 80, a computer 82, or any combination thereof. The term "cloud" may refer to various evolving arrangements, infrastructure, networks, and the like that will typically be based upon the Internet. The term may refer to any type of cloud, including a client clouds, application clouds, platform clouds, infrastructure clouds, server clouds, and so forth. In some embodiments, the network controller 14 is connected to the cloud 80 (e.g., internet, intranet) that enables the computer 82 to control the welding machines 10. The computer 82 may include, but is not limited to a desktop computer, a laptop computer, a tablet, a cellular phone, or any combination thereof.

An operator may utilize the cloud 80 to monitor, control, reset, and/or update the welding system 76 from any location that may connect to the cloud 80. For example, a fleet of welding machines 10 may form a welding system 76 in which the welding machines 10 are disposed in different facilities, including facilities in different cities, states, or countries. Through the remote network 78 connected to the welding system 76, such as through the cloud 80, an operator may transmit updates and instructions to reset the fleet of welding machines 10 of the welding system 76. The remote network 78 enables the operator to update and reset the fleet of welding machines 10 without physically travelling to each welding machine 10. Moreover, the welding machines 10 of the welding system 76 may be updated and reset at approximately the same time.

A first welding machine 84 connected to the remote network 78 is part of a robotic welding system 86. The robotic welding system 86 provides automation for utilizing the first welding machine 84 to perform welding applications according to instructions provided to the robotic welding system 86. The remote network 78 connects to the operating components 16 of the first welding machine 84 to enable the respective processors 32 to be reset without turning off the power conversion circuitry 20 of the first welding machine 84. The remote network 78 is connected to a shared reset line 88 that is common to the operating components 16 of the first welding machine 84. While the control circuitry 34, operator interface 40, and robotic interface 44 are shown in the first welding machine 84, other embodiments of the first welding machine 84 may include different quantities and configurations of the operating components 16 discussed above.

A second welding machine 90, a third welding machine 92, and a fourth welding machine 94 are connected to the remote network 78. Each of the second, third, and fourth welding machines 90, 92, 94 are configured to reset the respective processors by a different mode. Additionally, while the second, third, and fourth welding machines 90, 92, 94 show control circuitry 34 and operator interfaces 40, the welding machines 10 coupled to the remote network 78 may include one or more of the operating components 16 discussed above with FIG. 1. One or more of the operating components 16 of the second welding machine 90 are connected to a separate power source (e.g., a battery 96). In some embodiments, the reset signal from the remote network 78 resets the battery 96 to reset the processors 32 of the operating components 16. For example, the reset signal may open a switch 70 to power off the respective processors 32 of the second welding machine 90 for a time (e.g., approximately 1 to 10 seconds), then close the switch 70 to power on the respective processors 32, thus resetting the processors. The operating components 16 of the third welding machine 92 are connected to the shared reset line 88 that resets the operating components 16 in response to the reset signal. The shared reset line 88 may reset all the connected processors at approximately the same time. In some embodiments, the battery 96 responsive to the reset signal and the shared reset line 88 enable the operating components 16 to be reset approximately simultaneously (e.g., within approximately 1 second).

The fourth welding machine 94 includes the network interface 12 of FIG. 1 that is separately connected to each of the operating components 16. The network interface 12 enables the processors 32 of the operating components 16 to be selectively reset without turning off the power conversion circuitry 20 or the processors 32 of other operating components 16. For example, the network interface 12 may update the control processor 36 without updating the processor 32 of the operating interface 40.

The remote network 78 may reset each welding machine 10 with a separate reset signal, or may reset multiple welding machines 10 with a shared reset signal. Presently contemplated embodiments of the remote network 78 and welding machines 10 are not limited to resetting all the processors 32 in one manner, but may include resetting processors 32 of each welding machine 10 differently based on the configuration of the respective operating components 16. For example, a first reset signal from the remote network 78 may reset each of the processors 32 of the welding system 76 approximately simultaneously. A second reset signal may reset the processors 32 of the first welding machine 84 and the third welding machine 92 because of the shared reset line 88. The network interface 12 of the fourth welding machine 40 may determine which processors 32 to reset based on a third reset signal.

Figure 3:
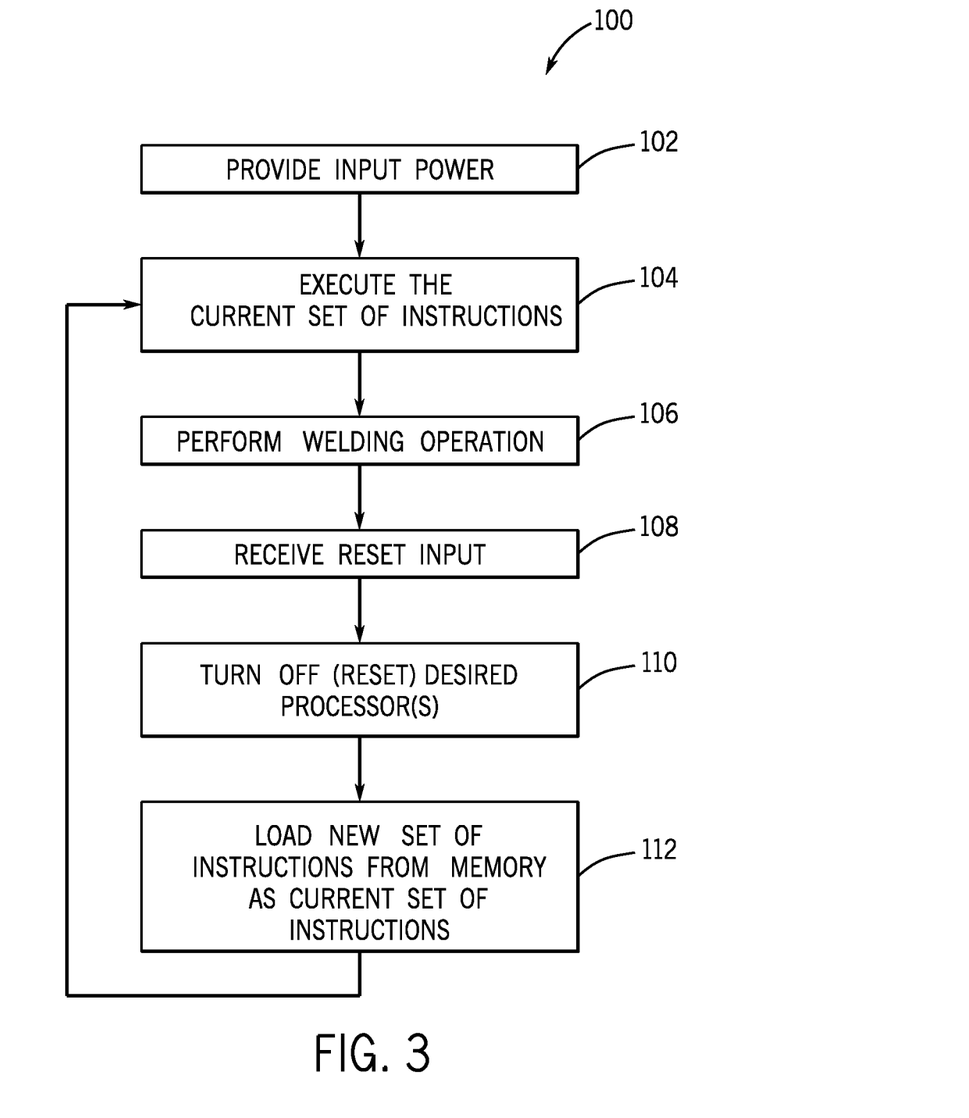
FIG. 3 is a flow chart of an embodiment of a method for resetting a processor of a welding machine.

FIG. 3 is a flow chart of an embodiment of a method 100 for operating a network of welding machines 10 and resetting one or more processors 32 of a welding machine 10 in the network. A power source 18 (e.g., wall outlet, battery) provides (block 102) input power to a welding machine 10. The input power enables the power conversion circuitry 20 and the operating components 16 to be turned on. The processors of the operating components 16 execute (block 104) the current set of instructions. The current set of instructions may be loaded into one or more memories 30 of the welding machine 10. Utilizing the current set of instructions, the welding machine 10 performs (block 106) the welding operation. For example, the current set of instructions for the control processor 36 adjusts the current and voltage of the welding power supplied to the torch 22 for the welding application. A processor 32 of temperature control circuitry 50 may execute the appropriate current set of instructions to drive a chiller to cool the torch 22 and/or the power conversion circuitry 20 to a desired temperature. The welding machine 10 may repeatedly perform (block 106) the welding operations as desired over a period of time. In some embodiments, the current set of instructions may be modified without resetting the power conversion circuitry 20 or the one or more processors 32. For example, the current levels, voltage levels, and/or pulse width of the weld power may be modified within the current set of instructions for the control processor 36.

When desired, the operator may provide a reset input to a network controller 14 of the network to reset one or more processors 32 of the network. In some embodiments, the operator may select which processor or processors 32 are to be reset. The network controller 14 receives (block 108) the reset input and supplies a reset signal to turn off (block 110), or reset, the desired one or more processors 32. Resetting only a processor 32 without turning off the power conversion circuitry 20 enables the set of instructions to be changed without subjecting the power conversion circuitry 20 to a power cycle, particularly a rapid power cycle from a reset of the welding machine 10. After the one or more processors 32 is turned off, a new set of instructions are loaded (block 112) from memory 30 to replace the current set of instructions. In some embodiments, the new set of instructions is an update to an operating system, a different set of communication protocols with a device (e.g., robotic welding system 86, wire feeder), or a different control scheme for the power conversion circuitry 20, or any combination thereof. Other sets of instructions may also be loaded from memory 30. The method 100 repeats so that the processors 32 execute (block 104) the current set of instructions and the welding machine 10 performs (block 106) welding operations until receiving (block 108) another reset input.

The welding system and method described herein may be used to remotely reset one or more processors 32 of a welding machine 10 without turning off the power conversion circuitry 20. In some embodiments, the one or more processors 32 enable the welding machine 10 to control the supplied welding power, control the environment (e.g., temperature) of the welding machine 10 and/or the torch 22, or to control other features of the welding machine 10. Remotely resetting one or more processors 32 may reduce the stress on circuitry elements (e.g., capacitors 22, inductors 26, and so forth) of the power conversion circuitry 20 from power cycles because the power conversion circuitry 20 is not turned off. Remotely resetting one or more processors 32 may enable the network controller 14 to reset multiple welding machines 10 connected to the remote network at approximately the same time. In some embodiments, the network controller 14 may remotely reset and update instructions for multiple welding machines 10 at a time, thereby reducing the amount of time for updating a network of welding machines 10. Additionally, resetting only one or more processors 32 may enable the welding machine 10 to be ready to perform a welding application more quickly than if the one or more processors 32 and the power conversion circuitry 20 were reset.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding machine comprising:
   power conversion circuitry configured to receive input power from a power source and to output welding power to a welding torch for performance of a welding operation;
   a plurality of welding operating components,
      wherein each welding operating component of the plurality of welding operating components comprises processing circuitry, each of the welding operating components is configured to provide a desired welding-related functionality to the welding machine; wherein the plurality of welding operating components comprises at least one of communications circuitry, polarity reversing circuitry, consumables control circuitry, robotics interface, temperature control circuitry, and auxiliary control circuitry; and remote reset circuitry communicatively coupled to the processing circuitry of each welding operating component of the plurality of welding operating components, wherein the remote reset circuitry is configured to receive a remote signal from a remote device, and to reset the processing circuitry of at least two welding operating components of the plurality of welding operating components based at least in part on the remote signal.

2. The welding machine of claim 1, wherein the remote reset circuitry is configured to reset the processing circuitry of the at least two welding operating components of the plurality of welding operating components simultaneously.

3. The welding machine of claim 1, wherein the remote reset circuitry comprises network interface circuitry configured to communicatively couple to the remote device via a remote network.

4. The welding machine of claim 3, wherein the remote reset circuitry is configured to communicatively couple to a network and the remote device via a wireless connection.

5. The welding machine of claim 1, wherein the remote reset circuitry comprises a wired connection.

6. The welding machine of claim 1, wherein the plurality of welding operating components comprises control circuitry configured to control one or more other welding operating components of the plurality of welding operating components.

7. The welding machine of claim 6, wherein the plurality of welding operating components comprises communication circuitry configured to facilitate communication between the welding machine and the welding torch, a wire feeder, a pendant, or any combination thereof.

8. The welding machine of claim 6, wherein the plurality of welding operating components comprises polarity reversing circuitry configured to shift a polarity of one or more terminals of the welding machine.

9. The welding machine of claim 6, wherein the plurality of welding operating components comprises consumables control circuitry configured to control a rate at which one or more consumables are consumed during the welding application.

10. The welding machine of claim 9, wherein the consumables control circuitry is configured to control a welding wire feeder.

11. The welding machine of claim 9, wherein the consumables control circuitry is configured to control a quantity or a type of shielding gas used in the welding application.

12. The welding machine of claim 6, wherein the plurality of welding operating components comprises temperature control circuitry configured to control heating equipment or cooling equipment in order to control a temperature of the welding machine, the welding torch, the workpiece, or any combination thereof.

13. The welding machine of claim 1, wherein the remote device is a desktop computer, a laptop computer, a tablet, a cellular phone, or a combination thereof.

14. The welding machine of claim 1, wherein the remote device is disposed in a remote location and wherein the remote signal is received via a network.

15. The welding machine of claim 1, wherein the remote reset circuitry is configured to reset the processing circuitry of the at least two welding operating components of the plurality of welding operating components without turning off the power conversion circuitry.

16. A welding system comprising:
a welding torch;
a wire feeder to provide wire to the welding torch;
power conversion circuitry configured to receive input power from a power source and to output welding power to the welding torch;
a plurality of welding operating components comprising:
control circuitry configured to control the power conversion circuitry and one or more other welding operating components of the plurality of welding operating components;
wherein each welding operating component of the plurality of welding operating components comprises a processor, wherein each of the welding operating components is configured to provide a desired welding-related functionality to the welding machine; and
wherein the plurality of welding operating components comprises communications circuitry, polarity reversing circuitry, consumables control circuitry, temperature control circuitry, or a combination thereof; and
remote reset circuitry communicatively coupled to the processors of the plurality of welding operating components, and configured to receive a remote signal from a remote device, wherein the remote reset circuitry is configured to reset the processors of at least two welding operating components of the plurality of welding operating components based at least in part on the remote signal without turning off the power conversion circuitry.

17. The welding system of claim 16, wherein the remote reset circuitry is configured to reset the processors of the at least two welding operating components of the plurality of welding operating components simultaneously.

18. The welding system of claim 16, wherein the remote device is a desktop computer, a laptop computer, a tablet, a cellular phone, or a combination thereof disposed in a remote location and wherein the remote signal is received via a network.

19. A welding machine comprising:
power conversion circuitry configured to be coupled to a power source, wherein the power conversion circuitry is configured to receive input power from the power source and to output welding power to a welding torch;
a plurality of welding operating components comprising:
control circuitry configured to control the power conversion circuitry;
wherein each welding operating component of the plurality of welding operating components comprises a processor, wherein each of the welding operating components is configured to generate an output, and wherein the welding power from the power conversion circuitry is controlled based at least in part on the outputs from the plurality of welding operating components, wherein the plurality of welding operating components comprises at least one of communications circuitry, polarity reversing circuitry, consumables control circuitry, robotics interface, temperature control circuitry, and auxiliary control circuitry; and
remote reset circuitry comprising a switch, wherein the remote reset circuitry is configured to be communicatively coupled between the power source and the processors of the plurality of welding operating components via one or more reset lines through which the plurality of welding operating components receive power, wherein the remote reset circuitry is configured to, based on a remote reset signal received from a remote device, open the switch to power off at least two of the processors of the plurality of welding operating components, and configured to close the switch to power on the at least two of the processors.

\* \* \* \* \*